(12) United States Patent
Ichiryu et al.

(10) Patent No.: US 9,133,330 B2
(45) Date of Patent: Sep. 15, 2015

(54) COMPOSITION FOR USE AS MATERIAL FOR ELECTRICAL OR ELECTRONIC PARTS, AND CURED PRODUCT THEREOF

(75) Inventors: Yoshikatsu Ichiryu, Settsu (JP); Jun Kotani, Settsu (JP)

(73) Assignee: KANEKA CORPORATION, Osaka (JP)

( * ) Notice: Subject to any disclaimer, the term of this patent is extended or adjusted under 35 U.S.C. 154(b) by 121 days.

(21) Appl. No.: 13/820,047

(22) PCT Filed: Aug. 23, 2011

(86) PCT No.: PCT/JP2011/004668
§ 371 (c)(1),
(2), (4) Date: Feb. 28, 2013

(87) PCT Pub. No.: WO2012/029249
PCT Pub. Date: Mar. 8, 2012

(65) Prior Publication Data
US 2013/0165593 A1 Jun. 27, 2013

(30) Foreign Application Priority Data
Sep. 1, 2010 (JP) .................................. 2010-195831

(51) Int. Cl.
*C08L 33/14* (2006.01)
*C08F 293/00* (2006.01)
*C08F 290/04* (2006.01)

(52) U.S. Cl.
CPC ............. *C08L 33/14* (2013.01); *C08F 290/046* (2013.01); *C08F 293/005* (2013.01); *C08F 2438/01* (2013.01)

(58) Field of Classification Search
CPC ...................................................... C08L 33/14
USPC ........................................................ 525/303
See application file for complete search history.

(56) References Cited

U.S. PATENT DOCUMENTS

| 6,964,999 | B1 | 11/2005 | Nakagawa et al. |
| 2009/0025870 | A1 | 1/2009 | Tanaka |

FOREIGN PATENT DOCUMENTS

| JP | 8272208 A | 10/1996 |
| JP | 2000-072816 A | 3/2000 |
| JP | 2000-095826 A | 4/2000 |
| JP | 2006-265488 A | 10/2006 |
| JP | 2007-077182 A | 3/2007 |
| JP | 2010-126680 A | 6/2010 |
| WO | 2007/004584 A1 | 1/2007 |

OTHER PUBLICATIONS

Machine translation of JP 2010-126680 (original reference provided by Applicant).*
International Search Report for PCT/JP2011/004668, mailing date of Dec. 6, 2011.
Translation of the International Preliminary Report on Patentability (PCT/ISA/237) (4 pages), (PCT/IB/373) (1 page) of International Application No. PCT/JP2011/004668 mailed Mar. 14, 2013 (Form PCT/IB/338) (1 page).

* cited by examiner

*Primary Examiner* — Ling Choi
*Assistant Examiner* — Catherine S Branch
(74) *Attorney, Agent, or Firm* — Westerman, Hattori, Daniels & Adrian, LLP

(57) ABSTRACT

A composition for use as material for electrical or electronic parts, comprising (A) a vinyl polymer having, at a molecular terminal thereof, at least one (meth)acryloyl group per molecule of the polymer, (B) a vinyl monomer having a (meth) acryloyl group and (C) an initiator, wherein the component (B) is comprised in an amount of from 25% by weight or more to 45% by weight or less to the total 100% by weight of the components (A) and (B).

14 Claims, No Drawings

COMPOSITION FOR USE AS MATERIAL FOR ELECTRICAL OR ELECTRONIC PARTS, AND CURED PRODUCT THEREOF

TECHNICAL FIELD

The present invention relates to a composition for use as material for electrical or electronic parts; and an electrical or electronic part material. The invention more specifically relates to a composition for use as material for electrical or electronic parts which contains a vinyl polymer having a (meth)acryloyl group, a vinyl monomer having a (meth)acryloyl group and an initiator, and which has low viscosity and rapid curability, and gives a cured product which attains excellent electrical insulation and resistance to discoloration of electrodes even under high-temperature and high-humidity conditions; and the electrical or electronic part material obtained by curing this composition.

BACKGROUND ART

As compositions for electrical or electronic part material, various curable resins are used for a wide range of uses. For example, epoxy resin, imide resin, amideimide resin, unsaturated polyester resin, phenolic resin and other curable resins are used for: semiconductor-sealing resin; impregnating resin for spinning, electrically insulating varnish; insulating material for a printed wiring board; impregnating resin for a printed wiring board; a coating agent for an electronic component; a conformal coating article; a potting agent for an electronic component; an adhesive for an electrical or electronic component; a compound for radiating heat from an electronic component; and the like. However, these resins have, for example, problems that cured products of the resins are hard, and the products cause the bonding wires to be cut because of a difference in linear expansion coefficient therebetween, and produce other bad effects. As a polymer which gives a rubbery curable resin and does not have these problems, known are, for example, silicone polymer, polyether polymer, hydrocarbon polymer, vinyl polymer and the like that are each a polymer having a hydroxyl group or a hydrolyzable group bonded to a silicon atom, and having at least one silicon-containing group which is to form a siloxane bond to be crosslinkable (hereinafter, the silicon-containing group may be referred to as the crosslinkable silyl group). The curing of these polymers is characterized in that heating is not necessarily required for the curing since the curing is based on the condensation reaction of the crosslinkable silyl groups, but has common problems, for example, slow curing speed, insufficient depth-curability and the like.

As polymers without these problems, silicone, polyether and hydrocarbon polymers have been suggested. The silicone polymers have problems about electrical properties thereof (see Patent document 1); thus, for example, a low-molecular-weight silicone compound present in the cure product causes an electrical contact-point hindrance. The polyether polymers, and unsaturated ones of the hydrocarbon polymers may be poor in heat resistance. Saturated ones of the hydrocarbon polymers themselves are high in viscosity to cause a problem about handleability. The inventors reported polymers whose main chains are vinyl polymers obtained by living radical polymerization and which respectively have at a terminal thereof a (meth)acryloyl group (Patent documents 2 to 4). Although cured products of these polymers are excellent in, for example, heat resistance and oil resistance, the products have problems about electrical insulation, and resistance to discoloration of electrodes. Thus, the products may not be used for sealing electrical members, or as adhesives.

PRIOR ART DOCUMENTS

Patent Documents

Patent Document 1: JP-A-08-272208
Patent Document 2: JP-A-2000-72816
Patent Document 3: JP-A-2000-95826
Patent Document 4: JP-A-2007-77182

SUMMARY OF THE INVENTION

Problems to be Solved by the Invention

An object of the present invention is to provide a composition for use as material for electrical or electronic parts having low viscosity and rapid curability; and a cured product which is excellent in not only heat resistance but also electrical insulation and resistance to discoloration of electrodes.

Means for Solving the Problems

In light of the above-mentioned actual situation, in order to improve electrical insulation, and resistance to discoloration of electrodes, the present inventors have conceived the use of a hydrophobic compound containing, for example, a long-chain aliphatic hydrocarbon group or a cyclic aliphatic hydrocarbon group. It is known that when water in the air comes into contact with electrode metal (such as copper, silver, tin, lead, nickel, gold, solder or the like), ion migration occurs to discolor the electrode metal, thus causing a short circuit. In other words, it is conceived that the use of a hydrophobic compound makes the cured product low in hygroscopicity. As a method utilizing the hydrophobic compound, there is first conceived a method in which a vinyl monomer having a hydrophobic hydrocarbon group is copolymerized with a vinyl polymer itself. However, a fear is caused about a problem that it is difficult to vaporize and remove any unreacted portion of the vinyl monomer having the hydrocarbon group with high boiling point after polymerization reaction, or that the resultant vinyl monomer has high viscosity to give a curable composition with high viscosity, thus making the composition poor in handleability. However, the present inventors have found out the following matter to attain the present invention: according to a method of mixing a vinyl monomer having a hydrophobic hydrocarbon group with a curable composition, the curable composition is easily made low in viscosity to be good in handleability; and the substituent structure of the vinyl monomer, or a combination of plural vinyl monomers as described above, enables curing properties of the composition to be easily controlled, and further the resultant cured product can exhibit electrical insulation, and resistance to discoloration of electrodes. Accordingly, the present invention relates to compositions described below for electrical or electronic part material, and cured products described below.

The invention relates to a composition for use as material for electrical or electronic parts, comprising:

(A) a vinyl polymer having, at a molecular terminal thereof, at least one (meth)acryloyl group per molecule of the polymer, the group being represented by the following general formula (1):

$$-OC(O)C(R^a)=CH_2 \qquad (1)$$

wherein $R^a$ represents a hydrogen atom or an organic group having 1 to 20 carbon atoms, (B) a vinyl monomer having a (meth)acryloyl group represented by the following general formula (2):

$$R^b\text{—}(OC(O)C(R^a)\text{=}CH_2)_n \quad (2)$$

wherein $R^a$ represents a hydrogen atom or an organic group having 1 to 20 carbon atoms, $R^b$ represents an organic group having 6 to 20 carbon atoms, and n represents an integer of 2 to 6, and (C) an initiator,
wherein the component (B) is comprised in an amount of 25 to 45% both inclusive by weight to the total 100% by weight of the components (A) and (B).

The present invention relates to a composition for use as material for electrical or electronic parts, comprising:

(A) a vinyl polymer having, at a molecular terminal thereof, at least one (meth)acryloyl group per molecule of the polymer, the group being represented by the following general formula (1):

$$\text{—}OC(O)C(R^a)\text{=}CH_2 \quad (1)$$

wherein $R^a$ represents a hydrogen atom or an organic group having 1 to 20 carbon atoms, (B) a vinyl monomer having a (meth)acryloyl group represented by the following general formula (2):

$$R^b\text{—}(OC(O)C(R^a)\text{=}CH_2)_n \quad (2)$$

wherein $R^a$ represents a hydrogen atom or an organic group having 1 to 20 carbon atoms, $R^b$ represents an organic group having 6 to 20 carbon atoms, and n represents an integer of 2 to 6, (D) a vinyl monomer having a (meth)acryloyl group represented by the following general formula (3):

$$R^c\text{—}OC(O)C(R^a)\text{=}CH_2 \quad (3)$$

wherein $R^a$ represents a hydrogen atom or an organic group having 1 to 20 carbon atoms, and $R^c$ represents an organic group having 6 to 20 carbon atoms, and (C) an initiator,
wherein the total amount of the components (B) and (D) is from 25% by weight or more to 65% by weight or less to the total 100% by weight of the components (A), (B) and (D), and the component (B) is comprised in an amount of 5% by weight or more of the total of the components (A), (B) and (D).

It is preferred that the total amount of the components (B) and (D) is from 30% by weight or more to 55% by weight or less to the total 100% by weight of the components (A), (B) and (D), and the component (B) is comprised in an amount of 15% by weight or more of the total of the components (A), (B) and (D).

It is preferred that the amount of the component (C) is from 0.001 to 10 parts by weight for 100 parts by weight of the total of the components (A), (B) and (D).

It is preferred that a main chain of the component (A) is produced by polymerizing acrylic ester monomers.

The main chain of the component (A) is preferably produced by living radical polymerization, more preferably by atom transfer radical polymerization.

The main chain of the component (A) is produced preferably by polymerizing vinyl monomers, using a chain transfer agent.

The number-average molecular weight of the component (A) is preferably 3000 or more.

About the vinyl polymer of the component (A), the ratio between the weight-average molecular weight thereof and the number-average molecular weight thereof is preferably less than 1.8. These molecular weights are measured by gel permeation chromatography.

The component (B) is preferably a vinyl monomer having two (meth)acryloyl groups per molecule of the monomer.

The component (C) is preferably an optical radical initiator.

The present invention relates to the composition for use as material for electrical or electronic parts, which comes into contact with electrode metal.

The present invention relates to an electrical or electronic part material obtained by curing the above-mentioned composition for use as material for electrical or electronic parts.

The present invention relates to a cured product obtained by curing the above-mentioned composition for use as material for electrical or electronic parts by an active energy ray or heat.

Effect of the Invention

Provided is a composition for use as material for electrical or electronic parts having low viscosity and rapid curability; and a cured product which is excellent in not only heat resistance but also electrical insulation and resistance to discoloration of electrodes.

MODE FOR CARRYING OUT THE INVENTION

The curable composition of the present invention will be described in detail as follows.

<<Component (A)>>

The component (A) in the present invention is a vinyl polymer having, at a molecular terminal thereof, at least one (meth)acryloyl group per molecule of the polymer, this group being represented by the following general formula (1):

$$\text{—}OC(O)C(R^a)\text{=}CH_2 \quad (1)$$

wherein $R^a$ represents a hydrogen atom or an organic group having 1 to 20 carbon atoms.

When the component (A) is produced, no reaction or side reaction may occur. Thus, the average value of the respective numbers of the (meth)acryloyl groups introduced into the vinyl polymer may fall out of the set range. When the average value of the respective numbers of the (meth)acryloyl groups introduced into respective terminals of the vinyl polymer is 0.8 or more, this mixture species is referred to as the component (A) in the present invention.

The average value of the respective numbers of the (meth)acryloyl groups introduced into the vinyl polymer is preferably from 0.8 to 2.3 both inclusive, more preferably from 1.5 to 2.5 both inclusive, even more preferably from 1.8 to 2.2 both inclusive. If the average value is less than 0.8, unreacted components in the cured product increase so that the product may be deteriorated in heat resistance and mechanical properties. If the average value is more than 3.0, crosslinked points of the cured product increase so that the product is declined in elongation. Thus, the product may be easily cracked.

One or more of the (meth)acryloyl groups introduced in the vinyl polymer are present at one of its molecular terminals. However, the position(s) of the other (meth)acryloyl group(s) is/are particularly not limited. The form of this vinyl polymer is preferably a form that the other (meth)acryloyl group(s) is/are present near the other molecular terminal, in particular preferably, a form that the other group(s) is/are present at the other molecular terminal since the vinyl polymer can be made long in the distance between its crosslinked points so that the cured product is improved in elongation property. In short, one or more (meth)acryloyl groups per molecule of the polymer are introduced into one or both of the molecular terminals of the vinyl polymer, and two (meth)acryloyl groups are preferably introduced into both the molecular terminals, respectively.

In each of the (meth)acryloyl group(s), $R^a$ represents a hydrogen atom or an organic group having 1 to 20 carbon atoms, preferably a hydrogen or a hydrocarbon group having 1 to 20 carbon atoms. The organic group is a group described hereinafter.

Examples of the hydrocarbon group having 1 to 20 carbon atoms include alkyl groups having 1 to 20 carbon atoms, aryl groups having 6 to 20 carbon atoms, aralkyl groups having 7 to 20 carbon atoms, a nitrile group and the like. These may have a substituent such as a hydroxyl group and the like.

Examples of the alkyl groups having 1 to 20 carbon atoms include methyl group, ethyl group, propyl group, butyl group, pentyl group, hexyl group, octyl group, decyl group and the like.

Examples of the aryl groups having 6 to 20 carbon atoms include phenyl group, naphthyl group and the like.

Examples of the aralkyl groups having 7 to 20 carbon atoms include benzyl group, phenylethyl group and the like.

Preferred specific examples of $R^a$ include —H, $CH_3$, —$CH_2CH_3$, —$(CH_2)_nCH_3$ wherein n represents an integer of 2 to 19, —$C_6H_5$, —$CH_2OH$, —CN and the like. Preferred are —H and —$CH_3$.

A vinyl monomer constituting a main chain of the component (A) is not particularly limited, and may be any monomer of various types. Examples thereof include (meth)acrylate monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, isobornyl (meth)acrylate, dicyclopentanyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, isostearyl (meth)acrylate, glycidyl (meth)acrylate, 2-aminoethyl (meth)acrylate, γ-(methacryloyloxypropyl)trimethoxysilane, ethylene oxide adducts of (meth)acrylic acid, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perlfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and the like; aromatic vinyl monomers such as styrene, vinyltoluene, α-methylstyrene, chlorostyrene, styrenesulfonic acid and salts thereof, and the like; fluorine-containing vinyl monomers such as perfluoroethylene, perfluoropropylene, vinylidene fluoride, and the like; silicon-containing vinyl monomers such as vinyltrimethoxysilane, vinyltriethoxysilane, and the like; maleic anhydride, maleic acid, and monoalkyl esters and dialkyl esters of maleic acid; fumaric acid, and monoalkyl esters and dialkyl esters of fumaric acid; maleimide monomers such as maleimide, methyl maleimide, ethyl maleimide, propyl maleimide, butyl maleimide, hexyl maleimide, octyl maleimide, dodecyl maleimide, stearyl maleimide, phenyl maleimide, cyclohexyl maleimide, and the like; nitrile-group-containing vinyl monomers such as acrylonitrile, methacrylonitrile, and the like; amide-group-containing vinyl monomers such as acrylamide, methacrylamide, and the like; vinyl esters such as vinyl acetate, vinyl propionate, vinyl pivalate, vinyl benzoate, vinyl cinnamate, and the like; alkenes such as ethylene, propylene, and the like; conjugated dienes such as butadiene, isoprene, and the like; vinyl chloride, vinylidene chloride, allyl chloride, allyl alcohol, and the like. These may be used alone, or in combination of two or more thereof.

Of these examples, aromatic vinyl monomers and (meth) acrylic monomers are preferred from the viewpoint of physical properties of the product. More preferred are acrylic ester monomers, and methacrylic ester monomers; and even more preferred are butyl acrylate, ethyl acrylate, and 2-methoxyethyl acrylate.

From the viewpoint of heat resistance, the main-chain-constituting vinyl monomer is in particular preferably butyl acrylate.

From the viewpoint of water absorption resistance and hygroscopicity resistance, the main-chain-constituting vinyl monomer is in particular preferably butyl acrylate or 2-methoxyethyl acrylate.

In the present invention, one or more of these preferred monomers may be copolymerized with the above-mentioned other monomer(s). At this time, the preferred monomer(s) is/are preferably contained in an amount of 40% by weight or more. In the above-mentioned expressing form, the wording "(meth)acrylic acid" represents acrylic acid and/or methacrylic acid; and the "(meth)acrylate" represents acrylate and/or methacrylate.

The molecular weight distribution of the component (A) [the ratio between the weight-average molecular weight (Mw) and the number-average molecular weight (Mn) each measured by gel permeation chromatography (GPC)] is not particularly limited, and is preferably less than 1.8, more preferably 1.5 or less, more preferably 1.3 or less. In the GPC measurement in the present invention, usually, chloroform or tetrahydrofuran is used as a mobile phase while a polystyrene gel column is used. The value of the molecular weight is obtained as a value in terms of that of polystyrene.

The number-average molecular weight of the vinyl polymer (A) in the present invention is not particularly limited. When measured by GPC, the molecular weight is preferably from 3,000 to 100,000, more preferably from 5,000 to 80,000, even more preferably from 8,000 to 50,000. If the molecular weight is too low, primary properties of the vinyl polymer (A) tend not to be exhibited. If the molecular weight is too high, the vinyl polymer (A) tends not to be easily handled.

<Method for Synthetizing Vinyl Polymer (A)>

The vinyl polymer (A) used in the present invention may be obtained by various polymerization methods without any especial limitation. From the viewpoint of versatility for monomers, easy controllability, and others, radical polymerization methods are preferred. Among these radical polymerization methods, controlled radical polymerization is more preferred. The controlled radical polymerization may be classified into "chain transfer agent method" and "living radical polymerization method". Living radical polymerization is more preferred, which makes it easy to control the molecular weight and the molecular weight distribution of the resultant vinyl polymer (A). Atom transfer radical polymerization is particularly preferred because of the availability of raw material and an easy introduction of a functional group into a terminal of the polymer. The radial polymerization, the controlled radical polymerization, the chain transfer agent method, the living radical polymerization, and the atom transfer radical polymerization are known polymerization methods. About these individual polymerization methods, reference may be made to, for example, JP-A-2005-232419, JP-A-2006-291073, and others, Hereinafter, a brief description will be made about the atom transfer radial polymerization, which is a preferred method for synthesizing the vinyl polymer (A) in the present invention.

In the atom transfer radial polymerization, it is preferred to use, as an initiator, for example, an organic halide, particularly, an organic halide having a highly reactive carbon-halogen bond (for example, a carbonyl compound having, at the α-position thereof, a halogen, or a compound having, at a benzyl position thereof, a halogen), or a halogenated sulfonyl compound. Specific examples thereof include compounds described paragraphs [0040]-[0064] of JP-A-2005-232419.

In order to obtain the vinyl polymer which has, at a single molecule thereof, two or more functional groups, it is preferred to use, as an initiator, an organic halide or a halogenated sulfonyl compound having two or more initiation points. Specifically, the following:

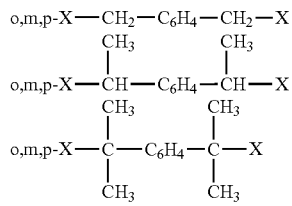

[Formula 1]

wherein each $C_6H_4$ represents a phenylene group; and each X is chlorine, bromine, or iodine;

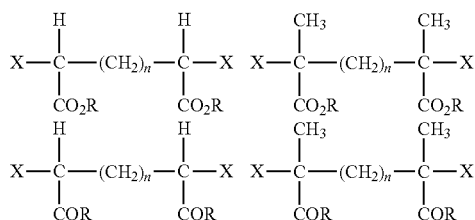

wherein each R represents an alkyl group having 1 to 20 carbon atoms, an aryl group or an aralkyl group; each n is an integer of 0 to 20; and each X is chlorine, bromine, or iodine;

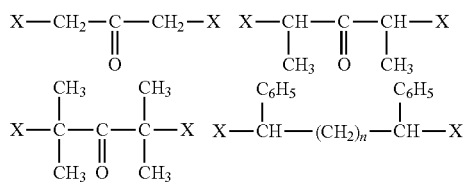

wherein each X represents chlorine, bromine, or iodine; and n is an integer of 0 to 20;

[Formula 2]

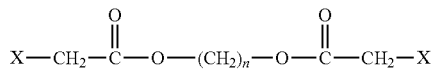

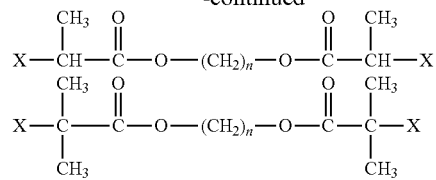

wherein each n represents an integer of 1 to 20; and each X represents chlorine, bromine, or iodine; and

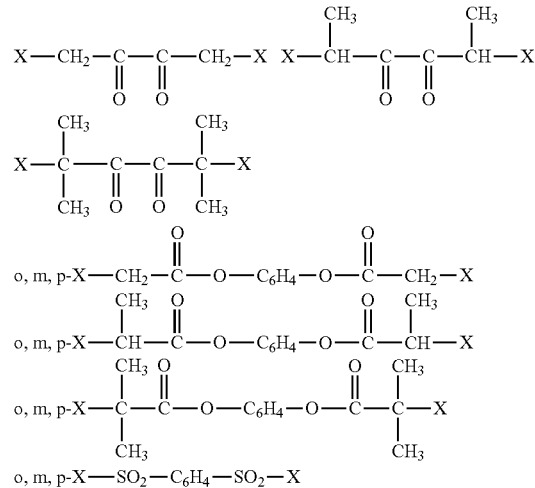

wherein each X represents chlorine, bromine, or iodine. are mentioned as examples thereof.

A vinyl monomer usable in the atom transfer radical polymerization is not particularly limited, and all of the above-mentioned examples of the vinyl monomer are preferably usable.

A transition metal complex used as a catalyst for the polymerization is not particularly limited, and is preferably a metal complex having, as a central metal, an element in Group 7, 8, 9, 10 or 11 in the periodic table, more preferably a metal complex having, as a central metal, zerovalent copper, monovalent copper, bivalent ruthenium, bivalent iron, or bivalent nickel, in particular preferably a copper complex. Specific examples of a compound of monovalent copper used to form the copper complex include cuprous chloride, cuprous bromide, cuprous iodide, cuprous cyanide, cuprous oxide, and cuprous perchlorate. When the copper compound is used, the following ligand is added thereto in order to enhance the catalytic activity: 2,2'-bipyridyl or a derivative thereof, 1,10-phenanthroline or a derivative thereof, polyamines such as tetramethylethylenediamine, pentamethyldiethylenetriamine, hexamethyltris(2-aminoethyl)amine or the like, or the like.

The polymerization reaction may be conducted without using any solvent. The reaction may be conducted in a solvent that may be of various types. The solvent types are not particularly limited. Examples thereof include solvents described in paragraph [0067] of JP-A-2005-232419. These may be used alone or in combination of two or more thereof. The polymerization may be conducted in an emulsion system, or in a system containing a supercritical fluid of $CO_2$ as a solvent.

The polymerization temperature is not particularly limited, and may range from 0 to 200° C., preferably from room temperature to 150° C.

<Method for Introducing Polymerizable Carbon-Carbon Double Bond>

For introducing a polymerizable carbon-carbon double bond, any known method may be used. Examples thereof include methods described paragraphs [0080]-[0091] of JP-A-2004-203932. Preferred is a product produced by the following method among these since the process of the method is more easily controlled: a method of substituting a terminal halogen group of a vinyl polymer with a compound having a polymerizable carbon-carbon double bond.

The (meth)acrylate polymer having the terminal halogen group is produced by a method of using the above-mentioned organic halide or halogenated sulfonyl compound as the initiator and using transition metal complex as the catalyst to polymerize vinyl monomers, or a method of using the halide compound as the chain transfer agent to polymerize vinyl monomers. The former method is preferred.

The compound having a polymerizable carbon-carbon double bond is not particularly limited, and may be a compound represented by the following general formula (4):

$$M^{+-}OC(O)C(R)=CH_2 \quad (4)$$

Specific examples of R in the formula (4) include —H, —CH$_3$, —CH$_2$CH$_3$, —(CH$_2$)$_n$CH$_3$ wherein n represents an integer of 2 to 19, —C$_6$H$_5$, —CH$_2$OH, —CN and the like. Preferred are —H and —CH$_3$.

In the formula (4), M$^+$ is a counter cation to the oxy anion. The species of M$^+$ may be alkaline metal ion. Specific examples thereof include lithium ion, sodium ion, potassium ion and quaternary ammonium ion. Examples of the quaternary ammonium ion include tetramethylammonium ion, tetraethylammonium ion, tetrabenzylammonium ion, trimethyldodecylammonium ion, tetrabutylammonium ion, dimethyl piperidinium ion and the like. Preferred are sodium ion and potassium ion.

The use amount of the oxy anion in the general formula (4) is preferably from 1 to 5 equivalents, more preferably from 1.0 to 1.2 equivalents relative to the amount of the halogen groups.

The solvent in which this reaction is conducted is not particularly limited, and is preferably a polar solvent since the reaction is a nucleophilic substitution reaction. Examples thereof include tetrahydrofuran, dioxane, diethyl ether, acetone, dimethylsulfoxide, dimethylformamide, dimethylacetoamide, hexamethylphosphoric triamide, acetonitrile and the like.

The temperature at which the reaction is conducted is not limited, and is generally from 0 to 150° C. The temperature is preferably from room temperature to 100° C. to keep the polymerizable terminal group.

<<Component (B)>>

The component (B) in the present invention is:
a vinyl monomer having a (meth)acryloyl group represented by the following general formula (2):

$$R^b-(OC(O)C(R^a)=CH_2)_n \quad (2)$$

wherein R$^a$ represents a hydrogen atom or an organic group having 1 to 20 carbon atoms, R$^b$ represents an organic group having 6 to 20 carbon atoms, and n represents an integer of 2 to 6. In a mixture of the components (A) and (B), the component (B) is contained in an amount of from 25% by weight or more to 45% by weight or less of the mixture. In the general formula (2), n is preferably 3 or less, more preferably 2 since the component (B) gives a cured product which is excellent in mechanical properties (elongation and strength).

R$^a$ may be the same as in the general formula (1).

R$^b$ is preferably an organic group having 6 to 20 carbon atoms, more preferably an organic group having 8 to 18 carbon atoms, even more preferably an organic group having 12 to 15 carbon atoms. If the number of the carbon atoms is less than 6, the component (B) tends to become volatile to be largely changed in weight at high temperature. If the number is more than 20, the component (B) tends to become high in viscosity to give a composition having a small viscosity-reducing effect.

R$^b$ preferably has a chain aliphatic structure and the number of carbon atoms therein is preferably 8 or more, more preferably 12 or more since the cured product is good in mechanical properties (elongation and strength) and excellent in water absorption resistance and hygroscopicity resistance.

Specific examples of the component (B) having this chain aliphatic structure include triethylene glycol di(meth)acrylate, dipropylene glycol di(meth)acrylate, 3-methyl-1,5-pentadiol dimethacrylate, 1,6-hexanediol di(meth)acrylate, 1,7-heptanediol di(meth)acrylate, 1,8-octanediol di(meth)acrylate, 2-methyl-1,8-octanediol di(meth)acrylate, 1,9-nonanediol di(meth)acrylate, 1,10-decanediol di(meth)acrylate and the like. In addition, another compounds represented by the following formulae are included:

$$CH_2=CHC(O)O-(CH_2)_n-OC(O)CH=CH_2$$

wherein n is an integer of 6 to 20,

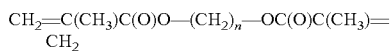
$$CH_2=C(CH_3)C(O)O-(CH_2)_n-OC(O)C(CH_3)=CH_2$$

wherein n is an integer of 6 to 20,

$$CH_2=CHC(O)O-(CH_2CH_2O)_n-OC(O)CH=CH_2$$

wherein n is an integer of 3 to 10, and

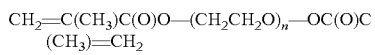
$$CH_2=C(CH_3)C(O)O-(CH_2CH_2O)_n-OC(O)C(CH_3)=CH_2$$

wherein n is an integer of 3 to 10.

The component (B) having the chain aliphatic structure is preferably a vinyl monomer having no ether structure since the component gives good heat resistance and electrical insulation. Examples of the vinyl monomer having no ether structure include 3-methyl-1,5-pentanediol di(meth)acrylate, 1,6-hexanediol di(meth)acrylate, 1,7-heptanediol di(meth) acrylate, 1,8-octanediol di(meth)acrylate, 2-methyl-1,8-octanediol di(meth)acrylate, 1,9-nonanediol di(meth) acrylate, 1,10-decanediol di(meth)acrylate and the like.

R$^b$ preferably has a cyclic structure, more preferably an alicyclic aliphatic structure, even more preferably a polycyclic aliphatic structure since the cured product is particularly excellent in water absorption resistance and hygroscopicity resistance.

Specific examples of the component (B) having this alicyclic aliphatic structure include cyclohexanedimethanol di(meth)acrylate, dimethylol-tricyclodecane di(meth)acrylate, 1,3-adamantanedimethanol di(meth)acrylate and the like. Examples of the component (B) which is particularly good in balance between water absorption resistance, hygroscopicity resistance, low volatility and low-viscosity effects include 1,9-nonanediol diacrylate, 1,10-decanediol diacrylate, and dimethylol-tricyclodecane diacrylate.

The vinyl monomer which has 3 to 6 (meth)acryloyl groups is not particularly limited, and is preferably trimethylolpropane tri(meth)acrylate, pentaerythritol tetra(meth)acrylate, ditrimethylolpropane tetra(meth)acrylate, dipentaerythritol penta(meth)acrylate, or dipentaerythritol hexa(meth)acrylate since the monomer is low in viscosity, high in reactivity and good in availability.

About the component (B), two or more species thereof may be used together.

The addition amount of the component (B) is from 25% by weight or more to 45% by weight or less to the total 100% by weight of the components (A) and (B), and is more preferably from 30% by weight or more to 40% by weight or less. If the addition amount of the component (B) is less than 25% by weight, the resultant cured product produces reduced resistance to discoloration of electrodes and viscosity-reducing effects. If the addition amount of the component (B) is more than 45% by weight, the cured product is deteriorated in mechanical properties (elongation and strength).

<<Component (D)>>

The component (D) in the present invention is:

a vinyl monomer having a (meth)acryloyl group represented by the following general formula (3):

$$R^c\text{—OC(O)C}(R^a)\text{=CH}_2 \qquad (3)$$

wherein $R^a$ represents a hydrogen atom or an organic group having 1 to 20 carbon atoms, and $R^c$ represents an organic group having 6 to 20 carbon atoms. The total of the components (B) and (D) is from 25% by weight or more to 65% by weight or less to the total 100% by weight of the components (A), (B) and (D), and the component (B) is contained in an amount of 5% by weight or more of the total of the components (A), (B) and (D). $R^a$ may be the same as in the general formula (1).

$R^c$ is preferably an organic group having 6 to 20 carbon atoms, more preferably an organic group having 8 to 18 carbon atoms, even more preferably an organic group having 12 to 15 carbon atoms. If the number of the carbon atoms is less than 6, the component (D) tends to become volatile to be largely changed in weight at high temperature. If the number is more than 20, the component (D) tends to become high in viscosity to give a composition having a small viscosity-reducing effect.

$R^c$ preferably has a chain aliphatic structure and the number of atoms therein is preferably 8 or more, more preferably 12 or more since the cured product is good in mechanical properties (elongation and strength) and excellent in water absorption resistance and hygroscopicity resistance. Specific examples of the component (D) having this chain aliphatic structure include n-hexyl methacrylate, n-heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-dodecyl (meth)acrylate, tridecyl (meth)acrylate, stearyl (meth)acrylate, isostearyl (meth)acrylate and the like. Other examples thereof include compounds represented by the following formulae:

$$CH_2\text{=CHC(O)O—}(CH_2)_n\text{—CH}_3$$

wherein n is an integer of 5 to 19, $$CH_2\text{=C(CH}_3)C(O)O\text{—}(CH_2)_n\text{—CH}_3$$

wherein n is an integer of 5 to 19, $$CH_2\text{=CHC(O)O—}(CH_2CH_2O)_n\text{—CH}_3$$

wherein n is an integer of 3 to 9, $$CH_2\text{=C(CH}_3)C(O)O\text{—}(CH_2CH_2O)_n\text{—CH}_3$$

wherein n is an integer of 3 to 9, $$CH_2\text{=CHC(O)O—}(CH_2CH_2O)_n\text{—CH}_2CH_3$$

wherein n is an integer of 2 to 9, and $$CH_2OC(CH_3)C(O)O\text{—}(CH_2CH_2O)_n\text{—CH}_2CH_3$$

wherein n is an integer of 2 to 9.

The component (D) having the chain aliphatic structure is preferably a vinyl monomer having no ether structure since the monomer is good in heat resistance and electrical insulation. Examples of the vinyl monomer having no ether structure include n-hexyl methacrylate, n-heptyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, isodecyl (meth)acrylate, n-dodecyl (meth)acrylate, tridecyl (meth)acrylate, stearyl (meth)acrylate, isostearyl (meth)acrylate and the like.

$R^c$ preferably has a cyclic structure, more preferably an alicyclic aliphatic structure, even more preferably a polycyclic aliphatic structure since the cured product is excellent in water absorption resistance and hygroscopicity resistance.

Specific examples of the component (D) having this alicyclic aliphatic structure include cyclohexyl (meth)acrylate, isobornyl (meth)acrylate, 3,3,5-trimethylcyclohexane (meth)acrylate, dicyclopentenyl (meth)acrylate, dicyclopentenyloxyethyl (meth)acrylate, dicylopentanyl (meth)acrylate, dicyclopentanyloxyethyl (meth)acrylate, 1-adamantantyl (meth)acrylate, tricyclopentanyl (meth)acrylate, tricyclopentenyl (meth)acrylate, N-(meth)acryloyl-ε-caprolactam, 3,4-epoxycyclohexylmethyl (meth)acrylate, and 3-ethyl-3-oxetanyl (meth)acrylate.

Specific examples of the component (D) having the polycyclic aliphatic structure include dicyclopentenyl (meth)acrylate, dicyclopentenyloxyethyl (meth)acrylate, dicyclopentanyl (meth)acrylate, dicyclopentanyloxyethyl (meth)acrylate, 1-adamantyl (meth)acrylate, tricyclopentanyl (meth)acrylate, and tricylopentenyl (meth)acrylate.

Specific examples of the component (D) having a cyclic structure other than any alicyclic aliphatic structure include phenyl (meth)acrylate, phenoxyethyl (meth)acrylate, toluoyl (meth)acrylate, benzyl (meth)acrylate, nonylphenoxypolyethylene glycol (meth)acrylate, and O-phenylphenol (meth)acrylate. Examples of the component (D) which is excellent in balance between water absorption resistance, hygroscopicity resistance, low volatility and low-viscosity effects include isononyl acrylate, isodecyl acrylate, n-dodecyl acrylate, isostearyl acrylate, isobornyl acrylate, and dicyclopentanyl acrylate.

About the component (D), two or more species thereof may be used in combination.

It is preferred to use the component (D) together with the component (B) since the cured product becomes good in mechanical properties (elongation and strength), and further the curable composition produces electrical insulation, resistance to discoloration of electrodes and viscosity-reducing effects.

When the components (B) and (D) are used together, the addition amount thereof is as follows: the total amount of the components (B) and (D) is from 25% by weight or more to 65% by weight or less to the total 100% by weight of the components (A), (B) and (D), and the amount of the component (B) is 5% by weight or more. Preferably, the total amount of the components (B) and (D) is from 30% by weight or more to 55% by weight or less, and the amount of the component (B) is 5% by weight or more. More preferably, the total amount of the components (B) and (D) is from 35% by weight or more to 45% by weight or less, and the amount of the component (B) is 5% by weight or more.

If the addition amount of the components (B) and (D) is less than 25% by weight, the composition is declined in resistance to discoloration of electrodes and viscosity-reducing effects. If the addition amount of the components (B) and (D) is more than 65% by weight, the cured product is declined in mechanical properties (elongation and strength) or the composition is strengthened in tackiness or declined in heat resistance.

When the components (B) and (D) are used together, the addition amount of the component (B) is 5% by weight or more. The amount is preferably 10% by weight or more, more preferably 15% by weight or more. If the addition amount of the component (B) is less than 5% by weight, the effect of resistance to discoloration of electrodes is deteriorated.

When the components (B) and (D) are used together, the addition amount of the component (B) is preferably 45% by weight or less, more preferably 40% by weight or less, even more preferably 35% by weight or less. If the addition amount of the component (B) is more than 45% by weight, the cured product is declined in mechanical properties (elongation and strength).

<<Component (C)>>

The component (C) in the present invention is, for example, a photopolymerization initiator, a thermopolymerization initiator, a redox initiator or the like.

Each of the photopolymerization initiator, the thermopolymerization initiator and the redox initiator may be used alone, or in the form of a mixture of two or more thereof. When the mixture is used, the use amount of each of the initiators is preferably within a range of the amount of the initiator that will be described later.

When an active energy ray is used to cure the composition, the initiator is not particularly limited. The initiator is preferably an optical radical initiator or an optical anion initiator, in particular preferably an optical radical initiator.

Examples of the optical radical initiator include acetophenone, propiophenone, benzophenone, xanthol, fluorein, benzaldehyde, anthraquinone, triphenylamine, carbazol, 3-methylacetophenone, 4-methylacetophenone, 3-pentylacetophenone, 2,2-diethoxyacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy ketal, 2-chlorothioxanthone, 2,2-dimethoxy-1,2-diphenylethane-1-one, 1-hydroxy-cyclohexyl-phenyl-ketone, 2-hydroxy-2-methyl-1-phenyl-propane-1-one, 2-methyl-1-[4-(methylthio)phenyl]-2-morpholinopropane-1-one, 2-benzyl-2-dimethylamino-1-(4-morpholinophenyl)-butanone-1, dibenzoyl and the like. Of these examples, the optical radical initiators which are good in ultraviolet curing performance are preferably α-hydroxyketone compounds (such as benzoin, benzoin methyl ether, benzoin butyl ether, 1-hydroxy-cyclohexyl-phenyl-ketone and the like), phenyl ketone derivatives (such as acetophenone, propiophenone, benzophenone, 3-methylacetophenone, 4-methylacetophenone, 3-pentylacetophenone, 2,2-diethoxyacetophenone, 4-methoxyacetophenone, 3-bromoacetophenone, 4-allylacetophenone, 3-methoxybenzophenone, 4-methylbenzophenone, 4-chlorobenzophenone, 4,4'-dimethoxybenzophenone, 4-chloro-4'-benzylbenzophenone, bis(4-dimethylaminophenyl)ketone and the like.

Examples of the optical radical initiator capable of restraining the hindrance of oxygen in the surface of the cured product include those having, in the molecule thereof, two or more photo-decomposable groups, such as 2-hydroxy-1-[4-[4-(2-hydroxy-2-methyl-propionyl)-benzyl]phenyl]-2-methyl-propane-1-one (trade name: IRGACURE 127, manufactured by Ciba Japan K.K.), 1-[4-(4-benzoxylphenylsufanyl)phenyl]-2-methyl-2-(4-methylphenylsulfonyl)propane-1-one (trade name: ESURE 1001M), methylbenzoyl formate (trade name: SPEEDCURE MBF manufactured by Lambson), O-ethoxyimino-1-phenylpropane-1-one (trade name: SPEEDCURE PDO, manufactured by Lambson), or oligo[2-hydroxy-2-methyl-[4-(1-methylvinyl)phenyl]propanone (trade name: ESCURE KIP150, manufactured by Lamberti); the optical radical initiator of hydrogen pulling-out type having, in the molecule thereof, three or more aromatic rings, such as 1,2-octandione, 1-[4-(phenylthio)-,2-(O-benzoyloxime)], ethanone, 1-[9-ethyl-6-(2-methybenzoyl)-9H-carbazol-3-yl]-1-(O-acetyl oxime), 4-benzoyl-4'methyldiphenylsulfide, 4-phenylbenzophenone, 4,4',4"-(hexamethyltriamino)triphenylmethane or the like.

Examples of an initiator characterized in improving the composition in depth curability include acylphosphine oxides such as 2,4,6-trimethylbenzoyl-diphenyl-phosphine oxide, bis(2,4,6-trimethylbenzoyl)-phenylphosphine oxide, bis(2,6-dimethylbenzoyl)-2,4,4-trimethyl-pentylphosphine oxide, 2,4,6-trimethylbenzoyl-diphenyl-phosphine oxide and the like.

From the viewpoint of balance between the active energy ray curability and the storage stability of the curable composition of the present invention, the following are more preferred: 1-hydroxy-cyclohexyl-phenyl-ketone, 2-hydroxy-2-methyl-1-phenyl-propane-1-one, bis(4-dimethylaminophenyl)ketone, 2-hydroxy-1-[4-[4-(2-hydroxy-2-methyl-propionyl)-benzyl]phenyl]-2-methyl-propane-1-one (trade name: IRGACURE 127, manufactured by Ciba Japan K.K.), 1-[4-(4-benzoxylphenylsulfanyl)phenyl]-2-methyl-2-(4-methyl phenylsulfonyl)propane-1-one (trade name: ESURE 1001M), methylbenzoyl formate (trade name: SPEEDCURE MBF, manufactured by Lambson), O-ethoxyimino-1-phenylpropane-1-one (trade name: SPEEDCURE PDO, manufactured by Lambson), oligo[2-hydroxy-2-methyl-[4-(1-methylvinyl)phenyl]propanone (trade name: ESCURE KIP150, manufactured by Lamberti), 1,2-octanedione, 1-[4-(phenylthio)-,2-(O-benzoyloxime)], ethanone, 1-[9-ethyl-6-(2-methylbenzoyl)-9H-carbazol-3-yl]-1-(O-acetyloxime), 4-benzoyl-4'methyldiphenylsulfide, 4-phenylbenzophenone, 4,4',4"-(hexamethyltriamino)triphenylmethane, 2,4,6-trimethylbenzoyl-diphenyl-phosphine oxide, bis(2,4,6-trimethylbenzoyl)-phenylphsphine oxide, bis(2,6-dimethylbenzoyl)-2,4,4-trimethyl-pentylphosphine oxide, and 2,4,6-trimethylbenzoyl-diphenyl-phosphine oxide.

As a near-infrared-ray photopolymerization initiator, for example, a near-infrared-ray-absorbing cationic dye may be used. The near-infrared-ray-absorbing cationic dye is preferably, for example, a near-infrared-ray-absorbing cationic dye/borate anion complex disclosed in, for example, JP-A-3-111402 and JP-A-5-194619, which is excited by light energy within the range of 650 to 1500 nm. More preferably, a boron-containing sensitizer is used together.

These photopolymerization initiators may be used alone, in the form of a mixture of two or more thereof, or in combination with a different compound.

Specific examples of the combination with the different compound to improve the composition in curability include a combination with an amine such as diethanol/methylamine, dimethylethanolamine, triethanolamine and the like; a combination with iodonium salt such as diphenyliodonium chloride and the like; and a combination with an amine and a colorant such as methylene blue, and the like.

When the photopolymerization initiator is used, a polymerization inhibitor such as hydroquinone, hydroquinone monomethyl ether, benzoquinone, p-tert-butylcatechol and the like may be added thereto if necessary.

The addition amount of the component (C) is not particularly limited. From the viewpoint of curability and storage stability, the amount is preferably from 0.01 to 10 parts by weight, more preferably from 0.01 to 5 parts by weight for 100 parts by weight of the total of the components (A), (B) and (D).

The thermopolymerization initiator is not particularly limited, and may be, for example, an azo initiator, a peroxide initiator, a persulfate initiator or the like. The azo initiator is not limited, and examples thereof include 2,2'-azobis(4-methoxy-2,4-dimethylvaleronitrile) (VAZ033), 2,2'-azobis(2-amidinopropane)bihydrochloride (VAZ050), 2,2'-azobis(2,4-dimethylvaleronitrile) (VAZ052), 2,2'-azobis(isobutyronitrile) (VAZ064), 2,2'-azobis-2-methylbutyronitrile (VAZ067), and 1,1-azobis(1-cyclohexanecarbonitrile) (VAZ088) (each available from DuPont Chemical), 2,2'-azobis(2-cyclopropylpropionitrile), 2,2'-azobis(methyl isobutyrate) (V-601) (available from Wako Pure Chemical Industries, Ltd.) and the like.

The peroxide initiator is not limited, and examples thereof include benzoyl peroxide, acetyl peroxide, lauroyl peroxide, decanoyl peroxide, dicetyl peroxydicarbonate, di(4-t-butylcyclohexyl)peroxydicarbonate (Perkadox 16S, available from Akzo Nobel), di(2-ethylhexyl)peroxydicarbonate, t-butyl peroxypivalate (Lupersol 11) (available from Elf Atochem), t-butyl peroxy-2-ethylhexanoate (Trigonox 21-050) (available from AkzoNobel), dicumylperoxide and the like.

The persulfate initiator is not limited, and examples thereof include potassium persulfate, sodium persulfate, ammonium persulfate and the like.

The thermopolymerization initiator is preferably selected from the group consisting of azo initiators, and peroxide initiators. The initiator is more preferably 2,2'-azobis(methyl isobutyrate), t-butyl peroxypivalate, di(4-t-butylcyclohexyl)peroxydicarbonate, or any mixture thereof.

These thermopolymerization initiators may be used alone or in combination of two or more thereof.

When the thermopolymerization initiator is used as the component (C), the thermopolymerization initiator is present in a catalytically effective amount and the addition amount thereof is not particularly limited. The amount is preferably from 0.01 to 5 parts by weight, more preferably from 0.025 to 2 parts by weight for 100 parts by weight of the total of the components (A), (B) and (D) in the present invention.

The redox (oxidation/reduction) initiator can be used in a wide temperature range. Initiator species described below are particularly advantageous in being usable at normal temperature.

An appropriate redox initiator is not limited, and examples thereof include any combination of the persulfate initiator with a reducing agent (such as sodium hydrogenmetasulfite, sodium hydrogensulfite and the like); any combination of an organic peroxide with a tertiary amine, for example, a combination of benzoyl peroxide with dimethylaniline, and a combination of cumene hydroperoxide with an aniline; and any combination of an organic peroxide with a transition metal, for example, a combination of cumene hydroperoxide with cobalt naphthate, and the like.

The redox initiator is preferably the combination of an organic peroxide with a tertiary amine, or the combination of an organic peroxide with a transition metal, more preferably the combination of cumene hydroperoxide with an aniline, or the combination of cumene hydroperoxide with cobalt naphthate.

About the redox initiator, a single species thereof may be used alone or two or more species thereof may be used together.

When the redox initiator is used as the component (C), the redox initiator is present in a catalytically effective amount and the addition amount thereof is not particularly limited. The amount is preferably from 0.01 to 5 parts by weight, more preferably from 0.025 to 2 parts by weight for 100 parts by weight of the total of the components (A), (B) and (D) in the present invention.

<<Curable Composition>>

The curable composition of the present invention contains the vinyl polymer as the component (A), the vinyl monomer as the component (B), and the initiator as the component (C), and optionally contains the vinyl monomer as the component (D). In order to adjust the physical properties, various additives may be appropriately blended therewith if necessary. Examples thereof include a polymerizable monomer and/or oligomer, a curing adjustor, a metal soap, a filler, fine hollow particles, a plasticizer, an adhesion-imparting agent, a solvent, a flame retardant, an antioxidant, a light stabilizer, an ultraviolet absorbent, a physical property adjustor, a radical inhibitor, a metal inactivating agent, an antiozonant, a phosphorous-containing peroxide decomposer, a lubricant, a pigment, a foaming agent, a photocurable resin and the like. About each of these various additives, a single species thereof may be used, or two or more species thereof may be use together.

Specific examples of such additives are described in, for example, JP-B-4-69659, JP-B-7-108928, JP-A-63-254149, JP-A-64-22904 and the like.

<Polymerizable Monomer/Oligomer>

A monomer and/or oligomer other than the components (B) and (D) may be added to the curable composition of the present invention unless the advantageous effects of the present invention are damaged. A monomer and/or oligomer having a radical polymerizable group is/are preferred from the viewpoint of curability.

Examples of the radical polymerizable group include (meth)acryloyl groups such as (meth)acrylic groups and the like, a styrene group, an acrylonitrile group, a vinyl ester group, an N-vinylpyrrolidone group, an acrylamide group, a conjugated diene group, a vinyl ketone group, a vinyl chloride group and the like. Particularly preferred is/are a monomer and/or oligomer having a (meth)acryloyl group, which is/are similar to the vinyl polymer used in the present invention.

Specific examples of the monomer include (meth)acrylate monomers, cyclic acrylates, styrene-based monomers, acrylonitrile, vinyl ester monomers, N-vinylpyrrolidone, acrylamide monomers, conjugated diene monomers, vinyl ketone monomers, vinyl halide/vinylidene halide monomers, polyfunctional monomers and the like.

Examples of the (meth)acrylate monomers include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, 2-methoxyethyl (meth)acrylate, 3-methoxybutyl (meth)acrylate, 2-hydroxyethyl (meth)acrylate, 2-hydroxypropyl (meth)acrylate, glycidyl (meth)acrylate, 2-aminoethyl (meth)acrylate, N-(meth)acryloylmorpholine, tetrahydrofuranyl (meth)acrylate, γ-(methacryloyloxypropyl)trimethoxysilane, ethylene oxide adducts of (meth)acrylic acid, propylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perlfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate and the like.

Examples of the styrene-based monomers include styrene, α-methylstyrene and the like.

Examples of the vinyl ester monomers include vinyl acetate, vinyl propionate, vinyl butyrate and the like.

Examples of the acrylamide monomers include acrylamide, N,N-dimethylacryamide and the like.

Examples of the conjugated diene monomers include butadiene, isoprene and the like.

Examples of the vinyl ketone monomers include methyl vinyl ketone and the like.

Examples of the vinyl halide/vinylidene halide monomers include vinyl chloride, vinyl bromide, vinyl iodide, vinylidene chloride, vinylidene bromide and the like.

Examples of the polyfunctional monomers include neopentyl glycol polypropoxy di(meth)acrylate, trimethylolpropane polyethoxy(meth)triacrylate, bisphenol F polyethoxy di(meth)acrylate, bisphenol A polyethoxy di(meth)acrylate and the like.

Examples of the above-mentioned oligomer include epoxy acrylate resins such as bisphenol A type epoxy acrylate resin, phenol novolak type epoxy acrylate resin, cresol novolak type epoxy acrylate resin, COOH-group-modified epoxy acrylate resin and the like; urethane acrylate resins each obtained by reacting urethane resin with hydroxyl-group containing (meth)acrylate {hydroxyethyl (meth)acrylate, hydroxylpropyl (meth)acrylate, hydroxybutyl (meth)acrylate, pentaerythritol triacrylate or the like}, the urethane resin being obtained from polyol (such as polytetramethylene glycol, polyesterdiol made from ethylene glycol and adipic acid, ε-caprolactone-modifiedpolyesterdiol, polypropylene glycol, polyethylene glycol, polycarbonate diol, hydroxyl-group-terminated hydrogenated polyisoprene, hydroxyl-group-terminated polybutadiene, hydroxyl-group-terminated polyisobutylene and the like), and organic isocyanate (such as tolylene diisocyanate, isophorone diisocyanate, diphenylmethane diisocyanate, hexamethylene diisocyanate, xylylene diisocyanate and the like); resins each obtained by introducing a (meth) acrylic group via an ester bond to the polyol described just above; polyester acrylate resin, poly(meth)acrylacrylate resin (poly(meth)acrylic ester resin having a polymerizable reactive group) and the like.

Of the above-mentioned examples, preferred is/are the monomer and/or oligomer having a (meth)acryloyl group. The number-average molecular weight of the monomer and/or oligomer having a (meth)acryloyl group is preferably 5000 or less. When the monomer is used to enhance the surface curability, or decrease the viscosity for an improvement in the workability thereof, it is more preferred that the molecular weight is 1000 or less since the monomer is good in compatibility with others.

The use amount of the polymerizable monomer and/or oligomer is preferably from 1 to 200 parts by weight (the wording may be referred to merely as part(s) hereinafter), more preferably from 5 to 100 parts to 100 parts of the total of the components (A), (B) and (D) from the viewpoint of an improvement of the composition in surface curability, the supply of toughness thereto, and the workability thereof based on a decrease in the viscosity.

In order to improve the composition in electrical insulation, a radical-reactive oligomer having a hydrophobic main chain may be added thereto. Examples thereof include di(meth)acrylate having a butadiene skeleton (trade name: BAC-45, manufactured by Osaka Organic Chemical Industry Ltd.), urethane acrylate having a bis-A skeleton, epoxy acrylate having a bis-A skeleton, and polyester acrylate having a bis-A skeleton; respective hydrogenated products of these oligomers and the like.

For the curable composition of the present invention, it is allowable to use the curing reaction between the vinyl groups of the components (A), (B) and (D), together with a curing reaction other than the former reaction. An advantage of the use of the curing reactions together is as follows: for example, when the components (A), (B) and (D) in the present invention are cured, using a radical photopolymerization initiator as the component (C), its shade region, which is irradiated with no light, is insufficiently cured; in such a case, the shade region can be cured by the use of the curing reactions together.

When the curing reactions are used together, it is allowable to use a vinyl polymer that has at a molecular terminal thereof a (meth)acryloyl group, as the component (A), and that has as its molecule-terminated functional group an epoxy group, an alkenyl group, or a hydrolyzable silyl group. Methods for introducing these functional groups are described below.

[Epoxy Group]

For introducing an epoxy group to the vinyl polymer, any known method may be used. Examples thereof include methods described in paragraphs [0039]-[0056] of JP-A-2000-154212. Preferred examples thereof are also described in the same paragraphs.

[Alkenyl Group]

The method for introducing an alkenyl group, which can undergo a hydrosilylation reaction, to the resultant vinyl polymer may be any known method. Examples thereof include methods described in paragraphs [0042]-[0086] of JP-A-2004-059783. Preferred examples thereof are also described in the same paragraphs.

[Hydrolyzable Silyl Group]

The method for introducing a hydrolyzable silyl group to the resultant vinyl polymer may be any known method. Examples thereof include methods described in paragraphs [0076]-[0138] of JP-A-2000-191912. Preferred examples thereof are also described in the same paragraphs.

In the case of using the vinyl polymer having as its terminal functional group an epoxy group, an alkenyl group, or a hydrolyzable silyl group, the following polymerization initiator or polymerization catalyst is usable:

About the vinyl polymer having as its terminal functional group an epoxy group, as the polymerization initiator or the polymerization catalyst, for example, those described in paragraph [0059] of JP-A-2000-154212 are usable.

About the vinyl polymer having as its terminal functional group an alkenyl group, it is preferred that a hydrosilyl-group-containing compound is further used together. Examples thereof include those described in paragraphs [0087]-[0091] of JP-A-2004-059783. In order to promote the hydrosilylation reaction, a hydrosilylation catalyst is preferably used together, and examples thereof include those described in paragraph [0092] of the same.

About the vinyl polymer having as its terminal functional group a hydrolyzable silyl group, a curing catalyst is preferred. Examples thereof include catalysts described in paragraphs [0147]-[0150] of JP-A-2000-191912.

<Antioxidant>

Various antioxidants may be used in the curable composition of the present invention if necessary. Examples of these antioxidants include amine antioxidants, hindered phenolic antioxidants, phosphorous-containing antioxidants, sulfur-containing antioxidants and the like.

Of these examples, hindered phenolic antioxidants are preferred since the antioxidants scarcely discolor the cured product.

Specific examples thereof include 2,6-di-tert-butyl-4-methylphenol, 2,6-di-tert-butyl-4-ethylphenol, mono (or di or tri)(αmethylbenzyl)phenol, 2,2'-methylenebis(4-ethyl-6-tert-butylphenol), 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amylhydroquinone, triethylene glycol-bis-[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thiodiethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), diethylester-3,5-di-t-butyl-4-hydroxy-benzylphosphonate, 1,3,5-trimethyl-2,4,6-tris(3,5-di-t-butyl-4-hydroxybenzyl)benzene, calcium bis(ethyl 3,5-di-t-butyl-4-hydroxybenzylphosphonate), tris-(3,5-di-t-butyl-4-hydroxybenzyl)isocyanurate, 2,4-2,4-bis[(octylthio)methyl]o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)-benzotriazole, methyl-3-[3-t-butyl-5-(2H-benzotriazole-2-yl)-4-hydroxyphenyl]propionate/ polyethylene glycol (molecular weight: about 300) condensate, hydroxyphenylbenzotriazole derivatives, bis(1,2,2,6,6-pentamethyl-4-piperidyl) 2-(3,5-di-t-butyl-4-hydroxybenzyl)-2-n-butylmalonate, 2,4-di-t-butylphenyl-3,5-di-t-butyl-4-hydroxybenzoate and the like.

These hindered phenolic antioxidants may be used alone, or in combination of two or more thereof. From the viewpoint of an improvement in the composition in heat resistance, the following hindered phenolic antioxidants having a molecular weight of 600 or more are more preferred: tetrakis-[methylene-3-(3,5-di-tert-butyl-4-hydroxyphenyl)propionate]methane, tris-[N-(3,5-di-t-butyl-4-hydroxybenzyl)]isocyanurate, 1,3,5-trimethyl-2,4,6-tris(3,5-di-t-butyl-4-hydroxybenzyl)benzene, 3,9-bis{2-[3-(3-tert-butyl-4-hydroxy-5-methylphenyl)propionyloxy]-1,1-dimethylethyl}-2,4,8,10-tetraoxaspiro[5,5]undecane. The molecular weight may be measured using GC-MS or LC-MS.

The use amount of the hindered phenolic antioxidant(s) is preferably from 0.1 to 5 parts by weight for 100 parts by weight of the total of the vinyl polymers (A) and (B). If the amount is less than 0.1 parts by weight, the heat-resistance-improving effect is small. Even if the amount is more than 5 parts by weight, the resultant advantageous effect is not varied very much to cause an economical disadvantage.

<<Method for Producing Curable Composition>>

The curable composition of the present invention may be prepared in a one-liquid form, in which all the blend components are beforehand mixed with each other and the mixture is air-tightly sealed, or in a two-liquid form, in which a liquid A which omits only the initiator, the curing catalyst and a crosslinking agent is mixed with a liquid B in which the initiator, the curing catalyst and the crosslinking agent are mixed with a filler, a plasticizer, a solvent and others just before the composition is shaped.

<<Cured Product>>

The cured product of the present invention is obtained by curing the curable composition. The method for curing the curable composition is not particularly limited.

When a thermopolymerization initiator is used together as an initiator component, the curing temperature is varied depending upon the kinds of the used thermopolymerization initiator, components (A), (B) and (D) and any other additive components. Usually, the temperature is preferably from 50 to 250° C., more preferably from 70 to 200° C.

The curing can be attained by radiating light or electron beam from an active energy ray source onto the composition to be cured. The active energy ray source is not particularly limited, and may be, for example, a high-pressure mercury lamp, a low-pressure mercury lamp, an electron beam radiating apparatus, a halogen lamp, a light emission diode, a semiconductor laser, a metal halide and the like depending upon the nature of the used photopolymerization initiator. The curing temperature is preferably 100° C. or lower, more preferably 80° C., even more preferably 50° C. or lower. If the composition is cured at 100° C. or higher, the resultant cured product is largely strained because of linear expansion difference between the cured product and the substrate.

When the redox initiator is used as the different initiator, the curing temperature is preferably from −50 to 250° C., more preferably from 0 to 180° C.

<<Shaping Method>>

When the curable composition of the present invention is used as a shaped body, the method for the shaping is not particularly limited, and may be a shaping method that may be of various generally-used types. Examples thereof include casting, compression forming, transfer forming, injection molding, extrusion forming, rotational molding, hollow molding, thermal forming and the like. Preferred examples thereof include roll forming, calendering, extrusion forming, liquid injection molding, and injection molding since these forming methods can attain, in particular, automatization and continuous processing to be excellent in producing performance.

<<Usage>>

The curable composition and the cured product of the present invention are suitable for electrical or electric part materials coming into contact with electrode metal. However, the usage thereof is not particularly limited. The composition and the cured product may be used for any electrical insulating material such as electrically insulating coating material for electrical wire or cable, sealing material, an adhesive, a sticking agent, conformal coatings, a potting agent for electricity or electronics, heat radiating material, waterproof material, vibration-proof, vibration-deadening and quake-free materials, film, marine deck caulking, casting material, or shaping material.

In the field of electrical or electronic parts, these may be used, for example, for coating, potting or packing, or an O-ring or a belt, or the like. Specifically, these may be used as buffer material for a thick-film resistor for high-voltage, a circuit element of hybrid IC, an HIC, an electrically insulating component, a semiconductive component, a conductive component, a module, a printed circuit, a ceramic substrate, a diode, buffer material for transistor or a bonding wire; coating material for semiconductor element, optical fiber or the like for optical communication; potting material for a transformer high-voltage circuit, a printed board, a variable-resistor-attached transformer for high-voltage, an electrically insulating component, a semiconductive component, a conductive component, potting material for a solar battery, a flyback transformer for television or the like; sealing material for a heavy electrical component, a light electrical component, the sealing of the rear surface of a solar battery, or a circuit or substrate of an electrical or electronic appliance; or rubbery components such as decorations for lighting equipment, waterproof packings, vibration-proof rubbers, insect-repellent packings, vibration-proof and sound-absorbing material or air sealing material for a cleaner, a drip-proof cover for an electrical water heater, a heater packing, an electrode packing, a safety valve diaphragm, a hose for a tool for warming sake (or Japanese alcohol), a waterproof packing, an electromagnetic valve, waterproof packings for a steam oven range and a rice cooker/cooked-rice keeper, water-supply tank packing, a water absorbing valve, a drain receptacle packing, a connecting hose, a belt, a temperature-keeping heater packing, vapor-outlet seals, an oil packing for a burning appliance, an O-ring, a drain packing, a pressurizing tube, a ventilating tube, an air-blasting or intaking packing, a vibration-proof rubber, an oil-supply-port packing, an oil gauge packing, an oil supply pipe, a diaphragm valve, air supply pipes, a speaker gasket for an acoustic instrument, a speaker edge, a turntable sheet, a belt, or a pulley. These may be used as an adhesive for a cathode-ray tube wedge or neck, an electrically insulating component, a semiconductive component, a conductive component and others, repairing material for electric wire coating, electrically insulating sealing material for an electrical wire joint component, a roll for OA equipment, a wiper for ink, a vibration absorbing agent, a gel and others.

EXAMPLES

Hereinafter, the present invention will be described in more detail by way of specific working examples. However, the present invention is not limited to the examples.

In the examples, each "number-average molecular weight" and each "molecular weight distribution (ratio between weight-average molecular weight and number-average molecular weight)" were calculated out by the standard polystyrene conversion method using gel permeation chromatography (GPC). A GPC column used therein was a column filled with polystyrene crosslinked gels (shodex GPC K-804 and K-802.5, manufactured by Showa Denko K.K.), and a GPC solvent used therein was chloroform.

In the examples, "the number of (meth)acryloyl groups introduced per molecule of the polymer" was calculated out from the number-average molecular weight gained by $^1$H-NMR analysis and GPC.

(The $^1$H-NMR was made by the ASX-400 model manufactured by Bruker Corp., and a solvent used therein was deuterium chloroform. The measurement was made at 23° C.)
(Viscosity)

The viscosity of each of the obtained polymers and blends was measured at measurement temperature of 23° C. in accordance with a cone-flat plate system in JIS K 7117-2, using an E-type viscometer manufactured by Toki Sangyo Co., Ltd.
(Electrical Insulation Value)

For the electrical insulation value, a super electrical insulation meter of the SM-8213 model manufactured by Hioki E.E. Corp. was used. The value measured at DC voltage of 100 V after 30 seconds was defined as the electrical insulation value.
(Electrode Discoloration)

Each of samples of the examples was subjected to a high-temperature and high-humidity current-passing test, and subsequently its comb shaped substrate was visually observed. The comb shaped substrate had a positive electrode, a negative electrode, and an electrode to which no electric charge was to be applied. When a discoloration difference was not observed between these electrode metals, the sample was judged to be good (G). When a discoloration difference was observed between these electrode metals, the sample was judged to be bad (B).
(Mechanical Properties)

According to JIS K 6251, each of the cured products was cut out into a shape having a #3-dumbbell size and a thickness of 2 mm, and mechanical properties thereof were measured under 23° C. and 55% RH condition at the tensile speed of 200 mm/minute. In the tensile test, an autograph, AG-2000A, manufactured by Shimadzu Corp. was used.
(High-Temperature and High-Humidity Current-Passing Test)

In accordance with the voltage-applying humidity resistance test in Item 8.5.4 of JIS K 3197, a comb shaped substrate was used to carryout the test. About the comb shaped substrate, its conductor was made of copper, its substrate material was glass epoxy (FR4), and the width of the conductor, the interval of lines of the conductor, and the overlap margin were set to 0.318 mm, 0.318 mm, and 15.75 mm, respectively. After painted film of 50 μm thickness in each of the examples was formed on the comb shaped substrate, conductive wires were soldered thereto. The used conductive wires were coated conductive wires (electrical wires coated with fluorine-contained resin; diameter: 1.2 mm; rated voltage: 600 V), which are usable under the high-temperature and high-humidity condition.

The comb shaped substrate was set inside a constant-temperature and constant-humidity machine. The conductive wires were extended to the outside of this machine, and a current was constantly passed to the substrate. After a predetermined period, while the comb shaped substrate was kept at the high-temperature and high-humidity, the electrical insulation value was measured at ends of the conductive wires which were extended to the outside of the machine. Conditions for the high-temperature and high-humidity current passing test were as follow: DV voltage of 50 V, temperature of 85° C., relative humidity of 85%, and a period of 500 hours.
(Ultraviolet Curing)

The H bulb, LH6 model, manufactured by Fusion UV Systems Japan K.K. was used. Conditions for curing by ultraviolet rays were as follows: 1500 mW/cm$^2$, and 3000 mJ/cm$^2$.

Production Example 1

Synthesis of Poly(n-Butyl Acrylate) Having Acryloyl Groups at Both Terminals

One hundred parts of n-butyl acrylate were deoxidized. The inside of a reactor was deoxidized, and thereto were added 0.17 parts of cuprous bromide, 20 parts of n-butyl acrylate, 4.4 parts of acetonitrile, and 3.5 parts of diethyl 2,5-dibromoadipate. These components were mixed at 70° C. Thereto was added 0.010 parts of pentamethyldiethylenetriamine (abbreviated to the triamine hereinafter) to initiate polymerization reaction. Thereto were added 80 parts of the monomer mixture bit by bit to advance the polymerization reaction. In the middle of the polymerization, the triamine was appropriately added thereto to adjust the polymerization rate. While the internal temperature was adjusted to about 80° C. to about 90° C., the polymerization was advanced. When the monomer conversion rate (polymerization reaction rate) reached to 95% or more, a mixed gas of oxygen and nitrogen was introduced into the gas phase in the reactor. While the internal temperature was kept at about 80° C. to about 90° C., the reaction system was heated and stirred. The pressure was reduced to remove volatile components, thus concentrating the system. This was diluted with butyl acetate, and a filtration aid was added thereto to filtrate the system. Absorbents (KYOWARD 700SEN, and KYOWARD 500SH, manufactured by Kyowa Chemical Industry Co., Ltd.) were added to the resultant filtrate. The filtrate was heated and stirred, and then filtrated and concentrated. This was dissolved in N,N-dimethylacetoamide, and thereto were added potassium acrylate (about two equivalents relative to the amount of the terminal Br groups), a heat stabilizer (H-TEMPO: 4-hydroxy-2,2,6,6-tetramethylpiperidine-n-oxyl), and an absorbent (KYOWARD 700SEN). The mixture was heated and stirred at about 70° C. The pressure was reduced to distill off volatile components, and then the mixture was diluted with butyl acetate. A filtration aid was added thereto to filtrate the mixture. The filtrate was concentrated to obtain the "polymer II" having, at both terminals thereof, acryloyl groups, respectively.

About the "polymer I", the number-average molecular weight was 12,000, the molecular weight distribution was 1.2, and the average number of the introduced acryloyl groups per molecule of the polymer was 1.8.

Production Example 2

Synthesis of Poly(n-Butyl Acrylate/2-Ethylhexyl Acrylate) Having Acryloyl Groups at Both Terminals A monomer mixture of 2 parts of n-butyl acrylate and 98 parts of 2-ethylhexyl acrylate was deoxidized. The inside of a reactor was deoxidized, and thereto were added 0.29 parts of cuprous bromide, 20 parts of the monomer mixture, 8.9 parts of acetonitrile, and 2.5 parts of diethyl 2,5-dibromoadipate. These components were mixed at 80° C. Thereto was added 0.014 parts of pentamethyldiethylenetriamine (abbreviated to the triamine hereinafter) to initiate polymerization reaction. Thereto were added 80 parts of the monomer mixture bit by bit to advance the polymerization reaction. In the middle of the polymerization, the triamine was appropriately added thereto to adjust the polymerization rate. While the internal temperature was adjusted to about 80° C. to about 90° C., the polymerization was advanced. When the monomer conversion rate (polymerization reaction rate) reached to 95% or more, a mixed gas of oxygen and nitrogen was introduced into the gas phase in the reactor. While the internal temperature was kept at about 80° C. to about 90° C., the reaction system was heated and stirred. The pressure was reduced to remove volatile components, thus concentrating the system. This was diluted with butyl acetate, and a filtration aid was added thereto to filtrate the system. Absorbents (KYOWARD 700SEN, and KYOWARD 500SH, manufactured by Kyowa Chemical Industry Co., Ltd.) were added to the resultant filtrate. The filtrate was heated and stirred, and then filtrated and concentrated. This was dissolved in N,N-dimethylacetoamide, and thereto were added potassium acrylate (about two equivalents relative to the amount of the terminal Br groups), a heat stabilizer (H-TEMPO: 4-hydroxy-2,2,6,6-tetramethylpiperidine-n-oxyl), and an absorbent (KYOWARD 700SEN). The mixture was heated and stirred at about 70° C. The pressure was reduced to distill off volatile components, and then the mixture was diluted with butyl acetate. A filtration aid was added thereto to filtrate the mixture. The filtrate was concentrated to obtain the "polymer II" having, at both terminals thereof, acryloyl groups, respectively.

About the "polymer II", the number-average molecular weight was 13500, the molecular weight distribution was 1.3, and the average number of the introduced acryloyl groups per molecule of the polymer was 1.6.

Examples 1 to 9, Comparative Examples 1 to 9, and Reference Examples 1 to 2

A blending method (used in each of these examples) is described. An antioxidant was added to the "polymer I" or "polymer II" obtained in Production Example 1 or 2 as a component (A). These components were heated and mixed at 120° C. for 2 hours to dissolve the antioxidant in the "polymer I" or "polymer II". The resulting solution was cooled to 50° C. or lower, and thereto were added the component (B), the component (D), the component (C) and other components. The resultant mixture was subjected to a defoaming mixer (ARE-250, manufactured by Thinky Corp.) to be rendered homogeneous. The used component (C) was one obtained by previously heating and melting a component DAROCUR 1173 (manufactured by Ciba Japan K.K.), and a component IRGACURE 819 (manufactured by Ciba Japan K.K.). The blend amounts ("parts by weight") are shown in Tables 1 to 3. In the tables, LIGHT ACRYLATE DCP-A and V#260 as the components (B) represent dimethylol-tricyclodecane diacrylate, and 1,9-nonanediol diacrylate, respectively; ISTA, IBXA, and FA-513A as the components (D), represent isostearyl acrylate, isobornyl acrylate, dicyclopentanyl acrylate, respectively. NAUGUARD 445, and IRGANOX 1010 as the antioxidants represent 4,4'-bis($\alpha,\alpha'$-dimethylbenzyl)diphenylamine, and tetrakis-[methylene-3-(3,5-di-tert-butyl-4-hydroxyphenyl)propionate]methane, respectively.

The following describes a method for curing by ultraviolet. The blend was painted onto a comb shaped substrate to have thickness of 50 μm, and separately the blend was cast into a mold to have thickness of about 2 mm, thus two products were prepared. An ultraviolet radiating apparatus (H bulb, LH6 model, manufactured by Fusion UV Systems Japan K.K.) was used to cure the products at 1500 mW/cm$^2$ and 3000 mJ/cm$^2$. The test results are shown in Tables 1 to 3.

TABLE 1

|  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Component (A) | Polymer I | 70 | 65 | 60 | 60 | 60 | 100 | 100 | 80 | 50 |  |
| Component (B) | LIGHT ACRYLATE DCP-A, manufactured by Kyoeisha Chemical Co., Ltd. | 30 | 35 | 40 | 40 |  |  |  | 20 | 50 | 100 |
|  | V#260, manufactured by Osaka Organic Chemical Industry Ltd. |  |  |  |  | 40 |  |  |  |  |  |

TABLE 1-continued

| | | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Component (C) | DAROCUR 1173, manufactured by Ciba Japan K.K. | 0.1 | 0.1 | 0.1 | 0.1 | 0.1 | 0.1 | 0.1 | 0.1 | 0.1 | 0.1 |
| | IRGACURE 819, manufactured by Ciba Japan K.K. | 0.05 | 0.05 | 0.05 | 0.05 | 0.05 | 0.05 | 0.05 | 0.05 | 0.05 | 0.05 |
| Antioxidant | IRGANOX 1010, manufactured by Ciba Japan K.K. | 2 | 2 | | 2 | 2 | | 2 | 2 | 2 | 2 |
| | NAUGUARD 445, manufactured by Shiraishi Calcium Kaisha, Ltd. | | | 2 | | | 2 | | | | |
| Viscosity | Viscosity (Pa · s) at 23° C. | 8.8 | 6.7 | 5.2 | 5.2 | 0.8 | 61.0 | 61.2 | 15.9 | 2.8 | 0.2 |
| Electrical insulation value | Electrical insulation value before test | O.R. | O.R. | O.R. | O.R. | O.R. | 1.5E+11 | 1.6E+12 | O.R. | O.R. | O.R. |
| | Electrical insulation value after test at 85° C. and 85% RH for 500 hours | 1.2E+10 | 1.4E+10 | 1.4E+10 | 1.4E+10 | 1.2E+10 | 7.1E+0.9 | 8.1E+0.9 | 1.2E+10 | 3.1E+10 | 4.5E+10 |
| Electrode external appearance | Electrical insulation value after test at 85° C. and 85% RH for 500 hours | G | G | G | G | G | B | B | B | G | G |
| Mechanical properties | Maximum strength (MPa) | 5.1 | 7.7 | — | 3.8 | 2.1 | — | 0.3 | 2.7 | Unmeasurable | Unmeasurable |
| | Maximum elongation (%) | 11.0 | 9.7 | — | 3.4 | 4.8 | — | 29.6 | 18.8 | Unmeasurable | Unmeasurable |

In Examples 1 to 5 in which the component (B) was contained in an amount of from 25% by weight or more to 45% by weight or less to the total 100% by weight of the components (A) and (B), no discoloration was observed between their electrode metals after the high-temperature and high-humidity test. When the amount of the component (B) was less than 25% by weight, discoloration was observed between the electrode metals after the high-temperature and high-humidity test. When the amount of the component (B) was more than 45% by weight, hard cured products were given, so the dumbbells could not be cut out. For such hard cured products, their painted film edge tended to be peeled off from their substrate. In the column "Electrical insulation value", each O. R. represents over-range.

TABLE 2

| | | Example 6 | Example 7 | Example 8 | Example 9 | Comparative Example 6 | Comparative Example 7 | Comparative Example 8 | Comparative Example 9 | Comparative Example 10 |
|---|---|---|---|---|---|---|---|---|---|---|
| Component (A) | Polymer I | 60 | 60 | 40 | | 60 | 60 | 80 | 60 | |
| | Polymer II | | | | 70 | | | | | |
| Component (B) | LIGHT ACRYLATE DCP-A, manufactured by Kyoeisha Chemical Co., Ltd. | 20 | 20 | 10 | 10 | | | 10 | 20 | 10 |
| Component (D) | ISTA, manufactured by Osaka Organic Chemical Industry Ltd. | 20 | | | | 40 | | | | |
| | IBXA, manufactured by Osaka Organic Chemical Industry Ltd. | | 20 | 50 | | | 40 | 10 | | 90 |
| | FA-513A, manufactured by Hitachi Chemical Co., Ltd. | | | | 20 | | | | | |
| Some other component | Butyl acrylate | | | | | | | | 20 | |
| Component (C) | DAROCUR 1173, manufactured by Ciba Japan K.K. | 0.1 | 0.1 | 0.1 | 0.1 | 0.1 | 0.1 | 0.1 | 0.1 | 0.1 |
| | IRGACURE 819, manufactured by Ciba Japan K.K. | 0.05 | 0.05 | 0.05 | 0.05 | 0.05 | 0.05 | 0.05 | 0.05 | 0.05 |
| Antioxidant | IRGANOX 1010, manufactured by Ciba Japan K.K. | 2 | 2 | 2 | 2 | 2 | 2 | 2 | 2 | 2 |
| Viscosity | Viscosity (Pa · s) at 23° C. | 2.9 | 2.4 | 0.3 | 8.5 | 1.7 | 1.2 | 10.1 | 0.5 | — |

TABLE 2-continued

|  |  | Example 6 | Example 7 | Example 8 | Example 9 | Comparative Example 6 | Comparative Example 7 | Comparative Example 8 | Comparative Example 9 | Comparative Example 10 |
|---|---|---|---|---|---|---|---|---|---|---|
| Electrical insulation value | Electrical insulation value before test | O.R. | O.R. | O.R. | O.R. | O.R. | O.R. | O.R. | O.R. | O.R. |
|  | Electrical insulation value after test at 85° C. and 85% RH for 500 hours | 2.2E+10 | 1.9E+10 | 1.4E+10 | 4.5E+10 | 1.9E+10 | 2.5E+10 | 1.4E+10 | 1.3E+10 | 4.9E+10 |
| Electrode external appearance | Electrical insulation value after test at 85° C. and 85% RH for 500 hours | G | G | G | G | B | B | B | B | G |
| Mechanical properties | Maximum strength (MPa) | 4.2 | 7.9 | 14.2 | 4.5 | 0.7 | 3.6 | 1.8 | 2.9 | Unmeasurable |
|  | Maximum elongation (%) | 14.2 | 13.5 | 14.2 | 34.0 | 134.4 | 192.1 | 33.2 | 15.8 | Unmeasurable |

In Examples 6 to 9, in which the total of the components (B) and (D) was from 25% by weight or more to 65% by weight or less to the total 100% by weight of the components (A), (B) and (C), and the amount of the component (B) was 5% by weight or more, no discoloration was observed between their electrode metals after the high-temperature and high-humidity test. The elongation thereof was higher than when only the component (B) was used. When only the component (D) was used (Comparative Examples 6 and 7), discoloration was observed between their electrode metals after the high-temperature and high-humidity test. When the total of the components (B) and (D) was less than 25% by weight (Comparative Example 8), discoloration was observed between its electrode metals after the high-temperature and high-humidity test. When butyl acrylate having a substituent having less than 6 carbon atoms was used (Comparative Example 9), discoloration was observed between its electrode metals after the high-temperature and high-humidity test. When the total of the components (B) and (D) was more than 65% by weight without using any component (A) (Comparative Example 10), a hard cured product was given, so the dumbbell could not be cut out. For such hard cured product, its painted film edge tended to be peeled off from its substrate.

TABLE 3

|  |  | Reference Example 1 | Reference Example 2 |
|---|---|---|---|
| Component (A) | Polymer I | 100 | 60 |
| Component (B) | LIGHT ACRYLATE DCP-A, manufactured by Kyoeisha Chemical Co., Ltd. |  | 40 |
| Component (C) | DAROCUR 1173, manufactured by Ciba Japan K.K. | 0.1 | 0.1 |
|  | IRGACURE 819, manufactured by Ciba Japan K.K. | 0.05 | 0.05 |
| Antioxidant | NAUGUARD 445 | 2 | 2 |
| Electrical insulation value | Before test | 1.5E+11 | O.R. |
|  | After test at 85° C. for 500 hours | 2.5E+10 | 3.2E+11 |
| Electrode external appearance | After test at 85° C. for 500 hours | G | G |

Table 3 shows results obtained from electrical conduction tests made in the same manner on the respective comb shaped substrates in Comparative Example 1 and Example 3 of Table 1 at 85° C. and relative humidity of 10% or less. In each of Reference Examples 1 and 2, no discoloration was observed between its electrode metals. Thus, it is believed that the electrode discoloration was caused when the humidity was high. It is believed that the use of the components (B) and (D) of the present invention enhanced the hygroscopicity resistance of the painted film to improve the electrode discoloration.

INDUSTRIAL APPLICABILITY

The curable composition of the present invention can be low in viscosity, and be rapidly cured. The cured product thereof has good heat resistance, weather resistance, oil resistance, compressive permanent set, mechanical properties and the like, derived from the vinyl polymer, and is further improved in hygroscopicity resistance. Thus, the cured product is suitable for articles required to have hygroscopicity resistance, such as electrical or electronic part material, electrically insulating material, sealing material, an adhesive, a sticking agent, a potting agent, heat radiating material, waterproof material, vibration-proof, vibration-deadening or quake-free material, a film, marine deck caulking, casting material, coating material, shaping material or the like.

The invention claimed is:

1. A composition for use as material for electrical or electronic parts, comprising:

(A) a vinyl polymer having, at a molecular terminal thereof, at least one (meth)acryloyl group per molecule of the polymer, the group being represented by the following general formula (1):

$$-OC(O)C(R^a)=CH_2 \quad (1)$$

wherein $R^a$ represents a hydrogen atom or an organic group having 1 to 20 carbon atoms, (B) is at least one compound selected from the group consisting of the following compounds:
triethylene glycol di(meth)acrylate,
dipropylene glycol di(meth)acrylate,
3-methyl-1,5-pentadiol di(meth)acrylate,
1,6-hexanediol di(meth)acrylate,
1,7-heptanediol di(meth)acrylate,
1,8-octanediol di(meth)acrylate,
2-methyl-1,8-octanediol di(meth)acrylate,
1,9-nonanediol di(meth)acrylate,
1,10-decanediol di(meth)acrylate,
$CH_2=CHC(O)O-(CH_2)_n-OC(O)CH=CH_2$, wherein n is an integer of 6 to 20,
$CH_2=C(CH_3)C(O)O-(CH_2)_n-OC(O)C(CH_3)=CH_2$, wherein n is an integer of 6 to 20,
$CH_2=CHC(O)O-(CH_2CH_2O)_n-OC(O)CH=CH_2$, wherein n is an integer of 3 to 10,
$CH_2=C(CH_3)C(O)O-(CH_2CH_2O)_n-OC(O)C(CH_3)=CH_2$, wherein n is an integer of 3 to 10,
3-methyl-1,5-pentanediol di(meth)acrylate,
1,9-nonanediol di(meth)acrylate,
cyclohexanedimethanol di(meth)acrylate,
dimethylol-tricyclodecane di(meth)acrylate,
1,3-adamantanedimethanol di(meth)acrylate,
1,9-nonanediol diacrylate,
1,10-decanediol diacrylate, and
dimethylol-tricyclodecane diacrylate
trimethylolpropane tri(meth)acrylate,
pentaerythritol tetra(meth)acrylate,
di(trimethylolpropane) tetra(meth)acrylate,
dipentaerythritol penta(meth)acrylate, and
dipentaerythritol hexa(meth)acrylate,
(D) a vinyl monomer having a (meth)acryloyl group represented by the following general formula (3):

$$R^c-OC(O)C(R^a)=CH_2 \quad (3)$$

wherein $R^a$ represents a hydrogen atom or an organic group having 1 to 20 carbon atoms, and $R^c$ represents an organic group having 6 to 20 carbon atoms, and
(C) an initiator,
wherein the total amount of the components (B) and (D) is from 25% by weight or more to 65% by weight or less to the total 100% by weight of the components (A), (B) and (D), and the component (B) is comprised in an amount of 5% by weight or more.

2. The composition for use as material for electrical or electronic parts according to claim 1, wherein the total amount of the components (B) and (D) is from 30% by weight or more to 55% by weight or less to the total 100% by weight of the components (A), (B) and (D), and the component (B) is comprised in an amount of 15% by weight or more.

3. The composition for use as material for electrical or electronic parts according to claim 1, wherein the amount of the component (C) is from 0.001 to 10 parts by weight to 100 parts by weight of the total of the components (A), (B) and (D).

4. The composition for use as material for electrical or electronic parts according to claim 1, wherein a main chain of the component (A) is produced by polymerizing acrylic ester monomers.

5. The composition for use as material for electrical or electronic parts according to claim 1, wherein the main chain of the component (A) is produced by living radical polymerization.

6. The composition for use as material for electrical or electronic parts according to claim 5, wherein the main chain of the component (A) is produced by atom transfer radical polymerization.

7. The composition for use as material for electrical or electronic parts according to claim 1, wherein the main chain of the component (A) is produced by polymerizing vinyl monomers, using a chain transfer agent.

8. The composition for use as material for electrical or electronic parts according to claim 1, wherein the number-average molecular weight of the component (A) is 3000 or more.

9. The composition for use as material for electrical or electronic parts according to claim 1, wherein about the vinyl polymer of the component (A), the ratio between the weight-average molecular weight thereof and the number-average molecular weight thereof is less than 1.8, these molecular weights being measured by gel permeation chromatography.

10. The composition for use as material for electrical or electronic parts according to claim 1, wherein the component (B) is a vinyl monomer having two (meth)acryloyl groups per molecule of the monomer.

11. The composition for use as material for electrical or electronic parts according to claim 1, wherein the component (C) is an optical radical initiator.

12. The composition for use as material for electrical or electronic parts according to claim 1, which comes into contact with an electrode metal.

13. An electrical or electronic part material obtained by curing the composition for use as material for electrical or electronic parts recited in claim 1.

14. A cured product obtained by curing the composition for use as material for electrical or electronic parts recited in claim 1 by an active energy ray or heat.

* * * * *